March 1, 1966  C. P. DE BIASI  3,237,589
CENTRIPETAL AMPHIBIOUS VEHICLE
Filed Jan. 17, 1964  2 Sheets-Sheet 1
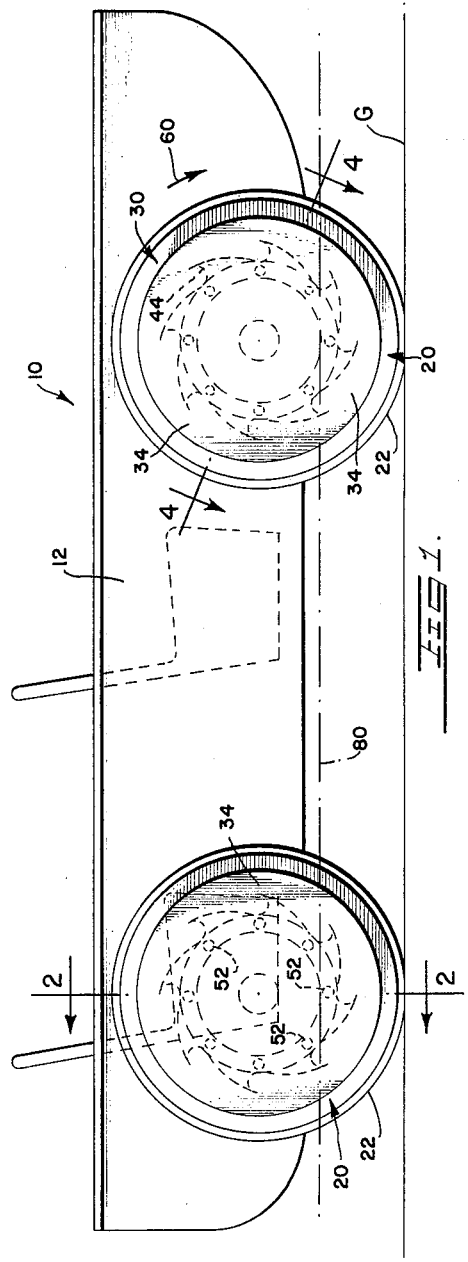
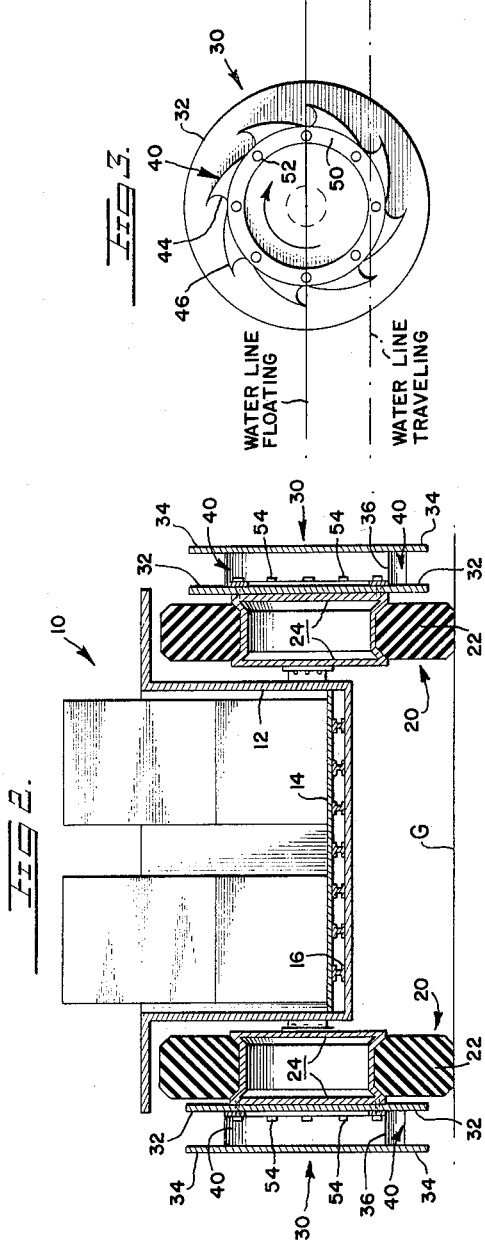
INVENTOR
Charles P. de Biasi
BY Robert Ned Roley
ATTORNEY March 1, 1966 C. P. DE BIASI 3,237,589
CENTRIPETAL AMPHIBIOUS VEHICLE
Filed Jan. 17, 1964 2 Sheets-Sheet 2
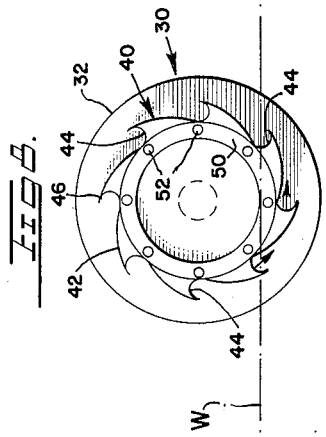
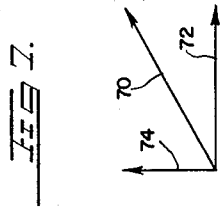
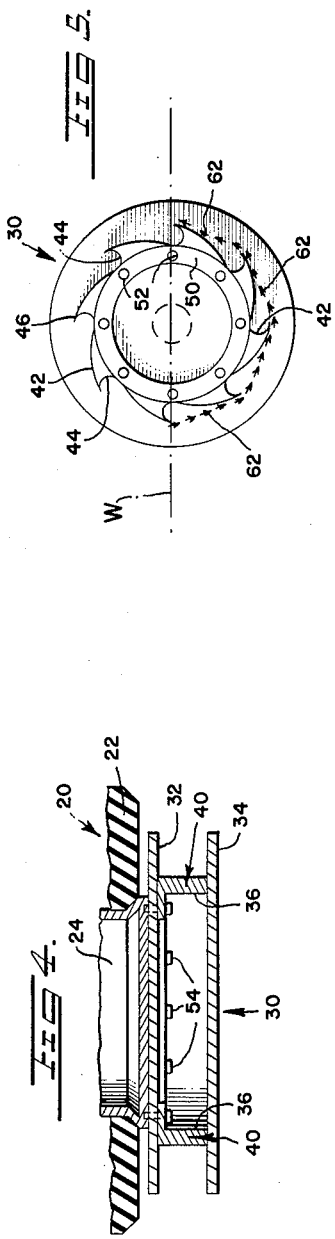
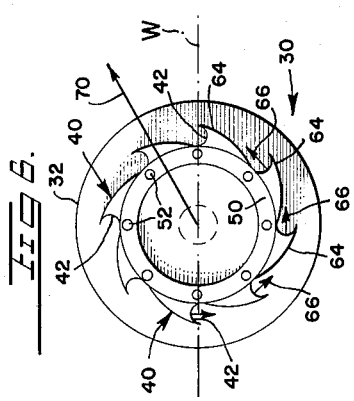
INVENTOR
Charles P. de Biasi
BY *Robert Ned Pole*
ATTORNEY

United States Patent Office 3,237,589
Patented Mar. 1, 1966

3,237,589
CENTRIPETAL AMPHIBIOUS VEHICLE
Charles P. de Biasi, 74 Braman Road, Waterford, Conn.
Filed Jan. 17, 1964, Ser. No. 338,517
14 Claims. (Cl. 115—1)

This invention relates to amphibious vehicles and more particularly to an amphibious vehicle of the centripetal type having rotary propulsion components thereon each possessing the combined functions of a hydrofoil and propeller when the vehicle is under way when waterborne.

It is accordingly a primary object of this invention to provide a centripetal type amphibious vehicle with driven rotary wheel structures fore and aft thereon which have combined hydrofoil and propeller functions when the vehicle is under way when waterborne in open water or in swamps and which function as ground support wheels when the vehicle is landborne.

It is another object of this invention to provide an amphibious vehicle having a buoyant hull-like structure with rotary wheel-like support-propelling members mounted fore and aft thereon and all propelled by suitable means within the buoyant hull-like structure whereby when waterborne and under way the hull-like structure is supported above the surface of the water by the propelled rotary wheel-like members and when the latter are released from the propelling means the buoyant hull-like structure is supported directly by the water.

It is also another object of this invention to provide an amphibious vehicle having a buoyant hull-like structure with a plurality of rotatable driven wheel units fore and aft and at each side thereof all of which are driven from within the hull-like structure and functioning as land support members when the vehicle is landborne, each wheel member having secured thereon a centripetal type support-propelling unit which, when the vehicle is waterborne, functions as rotary propellers to propel the vehicle and at the same time functions as rotary hydrofoils to partially or completely raise the hull-like structure in or relative to the water surface.

It is yet another object of this invention to provide an amphibious vehicle having 4-wheel drive wheel units supporting a buoyant hull-like structure and mounted to normally rotate about substantially horizontal axes, and wherein the wheel units each have a tread portion supporting the vehicle when landborne and another portion which functions to propel the vehicle when waterborne and simultaneously at least partially raise and maintain the hull-like structure so disposed relative to the surface of the water when driven above a predetermined minimum speed.

It is still yet another object of the invention to provide a steerable amphibious vehicle having buoyant body structure and driven composite rotary wheel structures mounted fore and aft thereon with each wheel structure comprising a portion which, when the vehicle is landborne, rotatably supports the vehicle and another portion which, when the vehicle is waterborne, functions as a combined lifting rotary hydrofoil and propeller device.

It is yet still another object of this invention to provide a buoyant, plural-wheeled, amphibious vehicle wherein all of the wheels are power driven and rotatably support the vehicle when landborne, each of the wheels having detachably secured thereon a co-axial, rotary hydrofoil and propelling structure for at least partially raisedly supporting and propelling the vehicle when waterborne.

It is moreover another object of this invention to provide a rotary hydrofoil-propeller unit adapted for detachably-mounting on a driven ground-engaging wheel of an amphibious vehicle and capable when so mounted to effectively reduce the resistance of the vehicle to movement through the water when waterborne and thereby materially increase the rate of travel.

It is likewise still another object of this invention to provide a centripetal type rotary hydrofoil-propelling unit of relatively simple, sturdy, and relatively low-cost construction adapted for ready attachment to any buoyant type vehicle having rotary driven fore and aft wheels which are normally disposed substantially horizontally and normal to the longitudinal axis of the vehicle.

Other objects, advantages and important features of the invention will be apparent from a study of the specification following, taken with the drawing, which together describe, disclose, illustrate and show certain embodiments, modifications, procedures and alternatives of this invention and what is now considered and believed to be the best method of practicing the principles thereof. Still other embodiments, modifications, procedures or equivalents may be subject to those having the benefit of the teaching herein, and such other embodiments, modifications, procedures or equivalents are intended to be reserved especially as they fall within the scope and breadth of the subjoined claims.

In the drawing:

FIGURE 1 is a schematic side elevational view of an amphibious vehicle constituting the preferred embodiment of my invention;

FIGURE 2 is a transverse vertical sectional view of the vehicle taken along the line 2—2 of FIGURE 1;

FIGURE 3 is a side elevational view of the rotary hydrofoil and impelling unit detached from the vehicle wheel and with the outer side flange member of the impelling unit removed to clearly show the vane structure thereof;

FIGURE 4 is a sectional view of the rotary impelling and lifting unit taken along line 4—4 of FIGURE 1;

FIGURE 5 is a view like FIGURE 3 but showing the manner in which the water flows against the vanes as the latter begin to rotate in the water;

FIGURE 6 is a view like FIGURES 3 and 5 but showing the reactive force of the vanes of the rotary impelling and lifting unit the instant it begins to rotate in the water;

FIGURE 7 is a diagram of the forces involved in FIGURE 6, and

FIGURE 8 is a view like FIGURE 6 but showing the effect of the resultant of the forces acting on the unit in FIGURE 6.

Attention is now directed to the embodiment of the invention as illustrated in the drawing wherein there is shown an amphibious vehicle 10 similar to the conventional and well known four-wheel drive "JEEP" but which is provided with a water-tight hull structure 12 to render same floatable or buoyant in a body of water W. It is to be understood that the invention however is not to be restricted to four-wheel drives; any number desired may be used.

The vehicle 10 is preferably provided with a double walled floor 14 having formed therein longitudinally extending channels, ducts or passages 16 in which would be located hydraulic conduits, electrical cables, etc. that would be associated with the drive transmission between the propulsion engine (not shown) and wheels or support structures 20.

While any desired type transmission might be utilized in the vehicle 10 under consideration, it however is preferred that the hydraulic propulsion system disclosed in my co-pending application Serial Number 286,319, filed June 7, 1963, be used in the vehicle of the instant disclosure. While it is intended that all four of the wheels or support structures 20 be simultaneously driven and the front wheels be steerable by any suitable conventional means, the structures involved in these regards are not illustrated since they form no part of the instant invention.

The wheels or support structures 20 of the vehicle 10 have been shown as equipped with treads 22 which may form portions of either pneumatic or solid rubber or other type tires. Each wheel or support structure 20 is provided with a pair of axially spaced apart inner and outer mounting rings or disks 24 and 26, respectively, positioned concentrically on the wheel proper. Secured onto the outer disk 24 co-axially of the respective wheel or support structure 20 is a hydro-reactive supporting and propelling unit 30 for propelling the vehicle when waterborne, the supporting and propelling unit 30 also functioning in the manner of a lifting hydrofoil as will be more fully explained later.

As is apparent from the drawing, noting particularly FIGURES 1, 2 and 4, the hydro-reactive supporting and propelling unit 30 comprises a pair of flat parallel annular ring disk-like members 32 and 34 of corresponding outer diameter spaced apart by and integrally connected with a substantially cylindrical section 36. The ring disk-like members 32 and 34 are of a diameter sufficiently less than that of the wheel tread 22 so as not to interfere with the vehicle support function thereof when the vehicle 10 is landborne. The outer annular surface of the cylindrical section 36 has fixedly mounted thereon in any suitable manner a plurality of reversely-curved centrifugal pump type vane-like constructions 40. The reversely-curved vane-like constructions each include a positively or generally outwardly curved vane surface portion 42 at the leading end of the vane-like construction 40 and an outwardly negatively curved, backwardly or rearwardly-facing, cup-shaped portion 44 at the trailing end of the portion 42 as regards the clockwise or forward rotation of the hydro-reactive supporting and propelling unit 30 and the wheel or support structure 20 during forward movement of the vehicle 10. The outermost tip 46 of the negatively curved, backwardly-facing cup-shaped portion 44 forms the trailing edge or terminal end of the positively-curved portion 42 of the vane-like constructions. As is clearly illustrated in FIGURE 4 the parallel ring disk-like members 32 and 34, which form the side walls of the vane-like constructions 40, extend radially beyond the vane-like constructions preferably a distance corresponding approximately to the radial depth thereof.

In order to provide for mounting the hydro-reactive supporting and propelling unit 30 laterally on and concentrically of the associated vehicle wheel or support structure 20, the inner ring disk-like member 32 in the present embodiment is extended radially inwardly of the cylindrical section 36 to provide an annular mounting portion 50 with a series of equally spaced apertures 52 in which cap screws 54 or the like may be mounted to rigidly secure the hydro-reactive supporting and propelling unit 30 onto the outer mounting disk 24 which is provided therefor on the respective wheel or support structure 20.

In describing the manner in which the amphibious vehicle 10, as illustrated, functions when waterborne it will first be assumed that the vehicle 10 is provided with an average loading therein.

Assuming the vehicle 10 to be landborne, as in FIGURE 1, with the wheels or support structures 20 rotatably supported on or carried by the vehicle 10 and in rolling contact with the ground surface G by means of the wheel treads 22, the driver (not shown) causes the vehicle engine (not shown), by means of a transmission system such as is disclosed in my earlier filed application above referred to, to drive the vehicle 10 forwardly or to the right in FIGURE 1 into a body of water W of such depth that the vehicle 10 will be supported solely by the buoyancy of the body or hull 12, the wheels or support structures 20 being free of any contact with the ground G. With the transmission of power to the wheels or support structures 20 now discontinued and the wheels or support structures 20 stopped from rotating, the vehicle 10 will float with the wheels or support structures 20 partially submerged to the extent that the axes thereof and the level W of the water approximately coincide, as shown in FIGURES 3 and 6.

Assuming now that forward propulsion of the vehicle 10 in the water W is desired, the transmission of power to the wheels or support structures 20 is resumed causing the hydro-reactive supporting and propelling units 30 to rotate in the direction of the arrows 60 in FIGURES 1 and 6.

The instant the hydro-reactive supporting and propelling units 30 begin rotating the water which is in contact with such of the vane-like constructions 40 thereof that are at this time immersed therein, the water will flow relatively outwardly over the vane-like constructions 40 in the manner indicated by the flow arrows 62 in FIGURE 5. This flow of the water results from the outward or centrifugal thrust imparted to the water by the rotating positive outwardly curved vane portions 42 of the vane-like constructions 40 which thrust the water centrifugally outward and away from the trailing edges 46 thereof which are dispersed directly above the backwardly facing cup-shaped vane portions 44.

Accordingly, there results two separate sets of forces reacting against the hydro-reactive supporting and propelling units 30. One set of these forces is the reactive pressure of the water against the positively curved vane surfaces 42 as it tends to resist being relatively moved upwardly and outwardly along each of these now rotating positively-inclined vane surfaces. This reactive thrust of the water against the vane surfaces 42 is indicated by the arrows 64 in FIGURE 6. The second reactive force results from the vacuum created in each of the backwardly facing cup-shaped vane portions 44 as the water is centrifugally thrown outwardly from the tip or trailing edge 46 of the vane surface 42 disposed directly above the rearward opening of the cup-shaped vane portion 44. The individual reaction forces produced in each vane portion 44 is likewise indicated in FIGURE 6 by the arrows 66. These induced individual reactive forces 64 and 66 acting against the hydro-reactive supporting and propelling units 30 when combined provide a resultant force 70 which acts upwardly and forwardly through the rotational axis of the hydro-reactive supporting and propelling units 30 as also indicated in FIGURE 6.

In the vector diagram of FIGURE 7 the resultant force 70, induced by the rotation of the hydro-reactive supporting and propelling units 30 in the water and acting thereagainst, is resolved into horizontal and vertical components 72 and 74, respectively. The horizontal component 72 is representative of the forward drive thrust imparted to the vehicle hull 12 by the hydro-reactive supporting and propelling units 30.

While the vertical lift imparted to the hull by the hydro-reactive supporting and propelling units 30 cannot exceed a value which will raise the units 30 in the water above that generally indicated in FIGURE 8 inasmuch as the development of the upward lifting force, as above described, necessitates a minimal amount of immersion of the vane-like constructions 40 of the hydro-reactive supporting and propelling units 30, nevertheless, the lift force developed may be sufficient to lift the hull 12 clear of the water surface W. In FIGURE 1 the relative location of the water surface below the hull 12 of the instant embodiment is indicated by the line 80. Of course, with different design, size and weight factors involved the optimum conditions of lift and speed will necessarily vary. In some instances while the lift of the hydro-reactive supporting and propelling units 30, due to increased vehicle loading may be insufficient to raise the hull 12 entirely clear of the water, nevertheless, it will result in lowering the resistance to movement of the hull through the water.

From the force diagram in FIGURE 7 it will be noted that when the resultant force 70 is inclined at an angle of 45 degrees the maximum speed of rotation of the hydro-reactive supporting and propelling unit 30 obtains for the condition of maximum lift force that can be developed consonant with a maximum permissible value of forward propelling thrust to the vehicle.

The relative ease with which the amphibious vehicle 10 of this invention can travel in water as well as on land, and particularly the relatively simple and uncomplicated hydro-reactive supporting and propelling units 30 with which the ground wheels or support structures 20 thereof are provided and which automatically function when the ground wheels or support structures are power driven, render it extremely well suited for use for travel through swampy land areas. By reason of the raising of the body or hull 12 within or above the watery or swampy surface during forward movement by the hydro-reactive supporting and propelling units 30 when the watery swamp material will not support the weight of the vehicle acting through the ground wheels or support structures 20, not only is the resistance to travel lessened but also it prevents such movement from being impeded by low lying objects extending up out of the watery swamp material, muck, etc.

While the invention has been described, disclosed, illustrated and shown in terms of a preferred embodiment the scope of the invention should not be deemed to be limited by the precise embodiment herein shown, described, illustrated and disclosed, such other embodiments or modifications being intended to be reserved as they fall within the scope of the claims hereto appended.

What I claim is:

1. In combination with a wheeled amphibious vehicle having a buoyant hull body wherein all of the wheels of the vehicle are adapted to be driven and controlled from within said hull body,
   a supporting and propelling hydro-reactive unit detachably mounted coaxially on each of the vehicle wheels,
   each of said supporting and propelling units comprising an annular peripherally open U-shaped structure,
   vane-like constructions disposed within said annular U-shaped structure and rigid with the sides and bottom thereof,
   said vane-like constructions comprising alternate positive and negative curved portions formed abutting each other throughout the annular extent of said U-shaped structure,
   said negative curved portions forming cupped rearwardly facing portions at the trailing end of each of said constructions with respect to the forward rotation of the vehicle wheels to enable said positive and negative curved vane portions to each develop a forwardly inclined force during the forward rotation of the vehicle wheels to at least partially lift the buoyant hull body relative to the water and simultaneously effect forward propulsion of the vehicle.

2. In combination with a wheeled amphibious vehicle as defined in claim 1 wherein
   the vehicle wheels each comprise mounting means mounted laterally thereon and coaxially therewith,
   detachable inter-engaging means on said mounting means and said annular structure of said supporting and propelling hydro-reactive unit for effecting the mounting of said unit on the respective vehicle wheel, said unit being of a lesser diameter than the respective vehicle wheel to permit normal support of the vehicle by said vehicle wheels when the vehicle is landborne.

3. In an amphibious vehicle wherein a buoyant hull structure is supported on rotatable ground-engaging wheels mounted fore and aft thereon and all adapted to be driven and controlled through suitable transmission means from within the buoyant hull structure, the combination with each of said ground-engaging wheels of hydro-reactive means for propelling the vehicle when waterborne comprising,
   annular channel means mounted coaxially on each of said wheels,
   cylindrically abutted vane-like constructions fixedly mounted in said annular channel means,
   said abutted means each having a cup-shaped portion at one end portion thereof and facing backwardly with respect to the direction of rotation of the wheels and a positive outwardly-curved vane portion at the opposite trailing end portion to centrifugally thrust against water when rotated in contact therewith.

4. In an amphibious vehicle as defined in claim 3 wherein
   each of said wheels comprises a mounting structure secured laterally and coaxially thereof,
   said hydro-reactive means being rigidly mounted on said mounting structure coaxially thereof, and
   said hydro-reactive means being of a diameter slightly less than the diameter of the respective wheel to avoid interferences with the function of the wheels when the vehicle is landborne.

5. In an amphibious vehicle as defined in claim 4 wherein
   each of said positive outwardly curved portions of said abutted vanes comprises a trailing edge juxtaposed directly over a cup-shaped portion of an adjacent vane,
   said positive outwardly-curved vane portions and said backwardly facing cup-shaped portions being operative when the amphibious vehicle is waterborne to simultaneously create forces to lift and propel the amphibious vehicle when said hydro-reactive means are rotated.

6. In an amphibious vehicle as defined in claim 3 wherein
   said annular channel means comprises a substantially cylindrical member,
   an annular disk integrally secured on each end portion of said cylindrical member thereby forming an outwardly opening annular channel in said channel means,
   one of said annular disks having a portion extending radially inwardly of said annular channel means,
   each of said ground engaging wheels having means laterally thereof for mounting said annular channel means, and
   means for demountably securing said annular channel means on said wheel lateral mounting means.

7. A vehicle adapted for landborne and waterborne travel, said vehicle comprising:
   a plurality of support structures rotatably carried by the vehicle,
   said support structures each having a portion for supporting the vehicle when landborne, and
   a hydro-reactive supporting and propelling unit carried by each of said support structures,
   each of said hydro-reactive supporting and propelling units comprising,
   a substantially cylindrical section,
   a pair of parallel annular disk-like members integrally secured on opposite ends of said substantially cylindrical section to define an outwardly open U-shaped substantially circular channel, and surface portions for partially hydro-reactively raising and supporting the vehicle above the normal floating level thereof while simultaneously reactively propelling the vehicle through the water when the support structures are rotated when the vehicle is waterborne, said surface portions being defined by a plurality of vane-like constructions having alternately reversely-curved surfaces fixedly mounted in surrounding relationship to said cylindrical section within the U-shaped channel and in contact with said disk-like members,
   said reversely-curved surfaces comprising rearwardly-facing outwardly negatively curved cup-shaped surface portions at the trailing ends of said vane-like constructions relative to the rotational direction of said support structures and positively generally radially outwardly curved surface portions at the opposite leading ends of said vane-like constructions.

8. In the vehicle as defined in claim 7 wherein the surface portions comprise reversely curved vane-like constructions of uniform size, said vane-like constructions being provided with alternate positively and negatively curved water reaction surfaces thereon, said negatively curved surfaces being disposed adjacent the forward end portion of the adjacent vane-like construction with respect to the forward directional rotation of said vehicle support structures to define rearwardly facing cupped portions.

9. A vehicle adapted for landborne and waterborne travel, said vehicle comprising a plurality of support structures rotatably carried by the vehicle, said support structures each having a portion for supporting the vehicle when landborne, and a hydro-reactive supporting and propelling unit carried by each of said support structures, each of said supporting and propelling units comprising a member mounted coaxially to the respective support structure for rotation therewith, vane-like constructions carried by the member and disposed thereon in spaced relationship relative to each other, each of said vane-like constructions having a portion defining a generally outwardly projecting substantially curved surface and a cup-like surface intersecting the curved surface to define an edge portion which is disposed in a trailing relationship relative to the rotation of the support structure, said surfaces of the vane-like constructions being effective on rotation of the support structures to enable reactive forces to be developed which will lift and propel the vehicle while the vehicle is waterborne.

10. The vehicle as set forth in claim 9, wherein:

said support structures and the respective members are each of substantially circular configuration with the diameter of the members being less than the diameter of the support structures, the vane-like constructions are disposed in substantially uniform circumferentially spaced relationship along the peripheral portion of the respective member, and project generally radially outwardly with the curved surface being tapered and inclined in a direction that is opposed to the direction of rotation of the support structures.

11. The vehicle as defined in claim 7 wherein said parallel annular disk-like members each have a radial extent slightly less than the radial extent of said support structures to enable said disk-like members to be free of ground contact when the vehicle is landborne.

12. A hydro-reactive supporting and propelling unit for attachment to a wheel of an amphibious vehicle for rotation therewith comprising:

an annular member having radially-outwardly opening U-shaped channel means, said U-shaped channel means having a cylindrical channel bottom member and parallel annular side members integrally connected to said bottom member, and end-abutted vane-like constructions on said channel bottom member and extending between said parallel annular side members, said vane-like constructions comprising reversely curved surface portions, each of said vane-like constructions projecting generally outwardly and being tapered, the forward end portion comprising a positive-outward curved surface, the opposite end portion of each of said vane-like constructions comprising a negative cup-shaped surface, the positive-outward curved surface and the negative cup-shaped surface intersecting at a trailing edge relative to the direction of rotation of the unit.

13. A hydro-reactive supporting and propelling unit as defined in claim 12 further comprising:

means on one of said parallel channel side members for coaxially mounting the hydro-reactive propelling unit on the wheel of an amphibious vehicle.

14. A hydro-reactive supporting and propelling unit as defined in claim 13 in which said one of said parallel annular channel side members has a radially inwardly extended portion of said cylindrical channel bottom member to define an opening of reduced size relative to the other of said parallel annular side channel members, said means for coaxially mounting the hydro-reactive supporting and propelling unit being located in said radially inwardly extended portion.

References Cited by the Examiner

UNITED STATES PATENTS

| 484,503 | 10/1892 | Lord | 115—49 |
| 1,526,258 | 2/1925 | Trasky | 115—1 |
| 1,701,925 | 2/1929 | Kisevalter | 114—66.5 |
| 1,710,869 | 4/1929 | Farrell | 115—1 X |
| 2,278,215 | 3/1942 | Poche | 115—1 |

FOREIGN PATENTS

| 118,712 | 6/1959 | Russia. |
| 472,938 | 8/1914 | France. |

MILTON BUCHLER, *Primary Examiner.*

ANDREW H. FARRELL, *Examiner.*